(12) United States Patent
Chang et al.

(10) Patent No.: US 9,355,042 B2
(45) Date of Patent: May 31, 2016

(54) MANAGING A TRANSLATION LOOKASIDE BUFFER

(71) Applicant: GLOBALFOUNDRIES INC., Grand Cayman (KY)

(72) Inventors: Xiao Tao Chang, Beijing (CN); Hubertus Franke, Cortlandt Manor, NY (US); Yi Ge, Beijing (CN); Kun Wang, Beijing (CN)

(73) Assignee: GLOBALFOUNDRIES INC., Grand Cayman (KY)

( * ) Notice: Subject to any disclaimer, the term of this patent is extended or adjusted under 35 U.S.C. 154(b) by 179 days.

(21) Appl. No.: 14/306,790

(22) Filed: Jun. 17, 2014

(65) Prior Publication Data
US 2014/0379956 A1    Dec. 25, 2014

(30) Foreign Application Priority Data

Jun. 21, 2013    (CN) .......................... 2013 1 0250683

(51) Int. Cl.
*G06F 12/00*    (2006.01)
*G06F 12/10*    (2016.01)
*G06F 9/455*    (2006.01)

(52) U.S. Cl.
CPC ........ *G06F 12/1027* (2013.01); *G06F 9/45558* (2013.01); *G06F 2009/45583* (2013.01); *G06F 2212/151* (2013.01)

(58) Field of Classification Search
None
See application file for complete search history.

(56) References Cited

U.S. PATENT DOCUMENTS

| 6,668,304 | B1 * | 12/2003 | Satran ................. G06F 11/1474 709/231 |
| 7,111,145 | B1 * | 9/2006 | Chen ..................... G06F 12/109 703/23 |
| 8,275,971 | B2 | 9/2012 | Franke et al. |
| 8,296,547 | B2 | 10/2012 | Heil et al. |

* cited by examiner

*Primary Examiner* — Brian Peugh
(74) *Attorney, Agent, or Firm* — Scully Scott Murphy and Presser (57) ABSTRACT

Method and apparatus for managing a translation lookaside buffer (TLB) at hardware in a virtualization enabled system. According to embodiments of the present invention, a series of operations caused by TLB miss would not need intervening from the hypervisor. On the contrary, when a TLB miss occurs, the hardware directly issues an interrupt to a virtual machine. In this way, the TLB can be efficiently managed by means of a hardware-level auxiliary translation table. Therefore, system overheads can be greatly reduced and system performance can be improved. Methods and apparatuses associated with hardware, hypervisor, and virtual machine in a virtualization enabled system are disclosed, respectively.

18 Claims, 6 Drawing Sheets

MANAGING A TRANSLATION LOOKASIDE BUFFER

CROSS-REFERENCE TO RELATED APPLICATION

This application claims priority under 35 U.S.C. §119 from Chinese Patent Application No. 201310250683.1 filed Jun. 21, 2013, the entire contents of which are incorporated herein by reference.

BACKGROUND OF THE INVENTION

1. Field of the Invention

The present invention relates to computer architecture. More specifically, the present invention relates to a method and apparatus for managing a translation lookaside buffer (TLB).

2. Description of Related Art

In modern computer architecture, the address mapping mechanism is widely applied. In a system, memory addresses used by high-level applications are virtual addresses (VAs). An operating system (OS) is responsible for mapping the VAs indicated by the applications to physical addresses (PAs) of the memory so as to achieve access to the memory resource. With development of technologies such as virtualization, address mapping may need to perform multiple times of the address translations. Specifically, virtualization allows multiple OSs to run concurrently on a single physical machine. Accordingly, a software layer called hypervisor is introduced for controlling access of a guest OS to the system's physical resources. At this point, address mapping comprises two address translations. First, the guest OS translates the guest virtual address (GVA) indicated by a guest application into a guest physical address (GPA). Then the hypervisor translates the GPA into a host physical address (HPA) which is an actual memory physical address.

In order to accelerate address translation, most modern computer processors are equipped with a translation lookaside buffer (TLB). TLB is a cache of a page table used for storing some entries in the page table. When performing address translation, the TLB is first accessed. If a page table entry containing the requested virtual address is present in the TLB (i.e., TLB hit), then the address translation can be quickly implemented. On the other hand, if the page table entry containing the requested virtual address is absent in the TLB (i.e., TLB miss), it is necessary to query the corresponding entry in the page table and write that entry into the TLB.

Generally speaking, there are two TLB management mechanisms, i.e., hardware management mechanism and software management mechanism. Compared with traditional hardware management mechanism, a software-managed TLB can realize a greater flexibility and therefore has been commonly used. However, in traditional software managed TLB, since the guest OS cannot access the TLB stored in hardware, the hypervisor must maintain a shadow TLB. Moreover, various operations caused by a TLB miss have to be handled by the hypervisor. During those operations, one or more handovers might have to be performed between a user mode and a privileged mode. As a result, such software management mechanisms cause significant overheads and seriously deteriorate the overall performance of the system.

Therefore, there is a need in the art to provide a method and apparatus for enabling software TLB management in a more efficient and effective way.

SUMMARY OF THE INVENTION

In view of the above problems, the present invention provides a method and apparatus for managing a TLB in a virtualization enabled system.

A first aspect of the present invention provides a method for managing a TLB at hardware in a virtualization enabled system. The method includes the steps of: querying the TLB with a guest virtual address indicated by a memory access instruction, the memory access instruction being received from a virtual machine running in the virtualization enabled system; in response to a miss of the guest virtual address in the TLB, issuing an interrupt to the virtual machine to cause the virtual machine to process the miss; and managing the TLB using an auxiliary translation table based on a result of a processing of the miss by the virtual machine, wherein an entry of the auxiliary translation table maps a guest physical address to a host physical address in the virtualization enabled system.

A second aspect of the present invention provides a method for managing a TLB at a hypervisor in a virtualization enabled system. The method includes the steps of: receiving an interrupt from a hardware of the system, the interrupt being caused by a miss of a guest physical address in an auxiliary translation table, and the guest physical address being determined according to a memory access instruction issued by a virtual machine running in the virtualization enabled system; determining a host physical address in the virtualization enabled system that corresponds to the guest physical address; and in response to the memory access instruction being directed to an access to a memory space, writing into the auxiliary translation table an entry that maps the guest physical address to the host physical address.

A third aspect of the present invention provides an apparatus for managing a TLB in a virtualization enabled system. The apparatus is implemented by hardware and includes: a TLB querying unit configured to query the TLB with a guest virtual address indicated by a memory access instruction, the memory access instruction being received from a virtual machine running in the virtualization enabled system; a first interrupt issuing unit configured to issue an interrupt to the virtual machine in response to a miss of the guest virtual address in the TLB, thereby causing the virtual machine to process the miss; and a TLB managing unit configured to manage the TLB using an auxiliary translation table based on a result of a processing of the miss by the virtual machine, wherein an entry of the auxiliary translation table maps a guest physical address to a host physical address in the system.

A fourth aspect of the present invention provides an apparatus for managing a TLB at a hypervisor in a virtualization enabled system. The apparatus includes: an interrupt receiving unit configured to receive an interrupt from a hardware of the virtualization enabled system, the interrupt being caused by a miss of a guest physical address in an auxiliary translation table, and the guest physical address being determined according to a memory access instruction issued by a virtual machine running in the virtualization enabled system; an address translating unit configured to determine a host physical address in the virtualization enabled system that corresponds to the guest physical address; and a translation table writing unit configured to write an entry into the auxiliary translation table in response to the memory access instruction being directed to an access to a memory space, wherein the entry maps the guest physical address to the host physical address.

BRIEF DESCRIPTION OF THE DRAWINGS

The above and other objectives, features and advantages of the present invention will become more apparent through more detailed depiction of the exemplary embodiments of the present invention with reference to the accompanying drawings.

FIG. 1 shows a schematic block diagram of an exemplary computer system/server which is applicable to implement embodiments of the present invention.

DETAILED DESCRIPTION OF THE PREFERRED EMBODIMENTS

Hereinafter, preferable embodiments of the present invention are depicted in more detail with reference to the accompanying drawings. Although the preferred embodiments of the present invention are shown in the accompanying drawings, it should be understood that the present disclosure can be implemented in various manners and thus should not be construed to be limited to the embodiments depicted herein. To the contrary, those embodiments are provided for the thorough and complete understanding of the present disclosure, and for the capability of completely conveying the scope of the present disclosure to those skilled in the art. Same or like reference numerals are used to represent same or corresponding elements throughout the drawings.

Those skilled in the art would appreciate that the present invention can be implemented as an apparatus, a method, or a computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
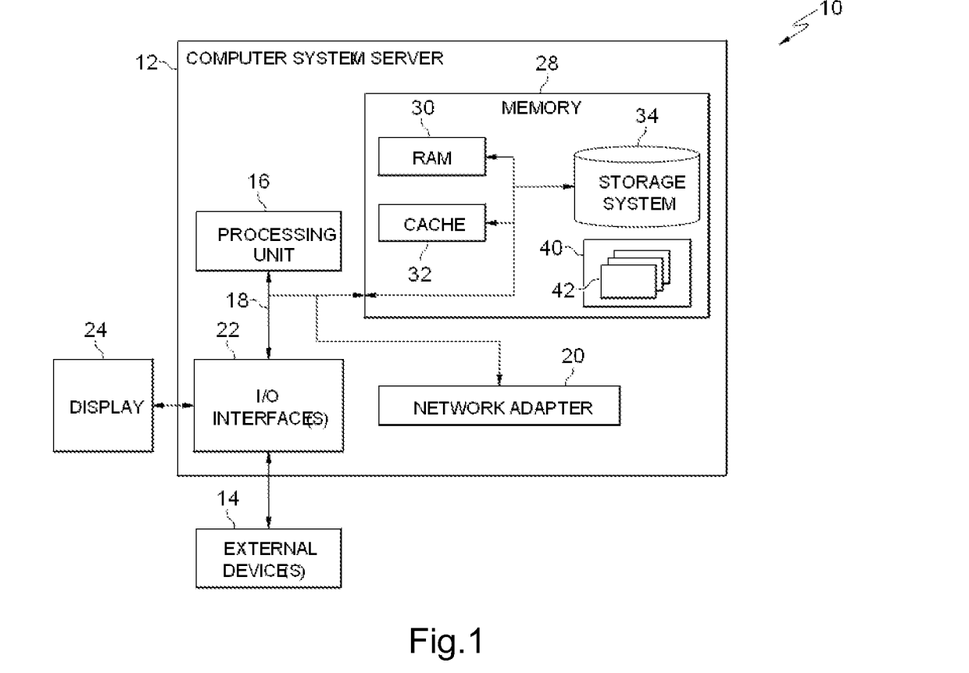

Hereinafter, exemplary embodiments of the present invention are described in detail with reference to the drawings. FIG. 1 shows an exemplary computer system/server 12 which is applicable to implement embodiments of the present invention; computer system/server 12 as shown in FIG. 1 is only an example, which should not construct any limitation to the functions and application scope of embodiments of the present invention.

As shown in FIG. 1, computer system/server 12 is embodied in the form of a general computing device. Components of computer system/server 12 can include, but are not limited to, one or more processors or processing units 16, system memory 28, and bus 18 connecting different system components (including system memory 28 and processing unit 16).

System bus 18 indicates one or more of a plurality of bus structures, including a memory bus or a memory controller, a peripheral bus, a graphic acceleration port, a processor, or a local bus using any bus structure in the plurality of bus structures. For example, the above architectures include, but are not limited to, an industrial standard architecture (ISA) bus, a MicroChannel Architecture (MAC) bus, an enhanced-ISA bus, a video electronic standard association (VESA) local bus, and a peripheral component interconnection (PCI) bus.

Computer system/server 12 typically includes various kinds of computer system-readable mediums. These mediums can be any available medium accessible by computer system/server 12, including volatile and non-volatile mediums, mobile and non-mobile mediums.

System memory 28 can include a computer system readable medium in a form of volatile memory, for example, random access memory (RAM) 30 and/or cache memory 32. Computer system/server 12 can further include other mobile/non-mobile, volatile/non-volatile computer system storage mediums. As an example, storage system 34 can be used to read/write a non-mobile, non-volatile magnetic medium (not shown in FIG. 1, generally called "a hard disk drive"). Although not shown in FIG. 1, a magnetic disk driver for reading/writing a mobile, non-volatile magnetic disk (for example, a "floppy disk") and an optical disk driver for reading/writing a mobile, non-volatile optical disk (for example, CD-RON, DVD-RON, or other optical medium) can be provided. In these cases, each driver can be connected to bus 18 via one or more data medium interfaces. System memory 28 can include at least one program product that has a set (for example, at least one) program modules, and these program modules can be configured to perform the functions of various embodiments of the present invention.

Program/utility tool 40 including a set (at least one) of program module 42 can be stored in for example system memory 28; such program module 42 includes, but is not limited to, an operating system, one or more applications, other program modules, and program data, and each of these examples or a certain combination thereof might comprise implementation of a network environment. Program module 42 generally executes the functions and/or methods in the embodiments as described according to the present invention.

Computer system/server 12 can also communicate with one or more peripheral devices, or external devices 14 (for example, a keypad, a pointing device, display 24, etc.), and can also communicate with one or more device that enable the user to interact with computer system/server 12, and/or communicate with any device (for example, network card, modem, etc.) that enables computer system/server 12 to communicate with one or more other computing devices. Such communication can be performed via input/output (I/O) interface 22. Moreover, computer system/server 12 can also communicate with one or more networks (for example, a local area network (LAN), a wide area network (WAN), and/or a public network, for example, Internet). As shown in the figure, network adapter 20 communicates with other modules of computer system/server 12 via bus 18. It should be appreciated that although not shown in the figure, other hardware and/or software modules can be used in combination with computer system/server 12, including, but not limited to, micro-code, device driver, redundancy processing unit, external disk driving array, RAID system, magnetic tape driver, and a data backup storage system, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block in the block diagrams and/or flowcharts and a combination of blocks in block diagrams and/or flowcharts may be implemented by a dedicated hardware-based system for executing a prescribed function or operation or may be implemented by a combination of dedicated hardware and computer instructions.

Figure 2:
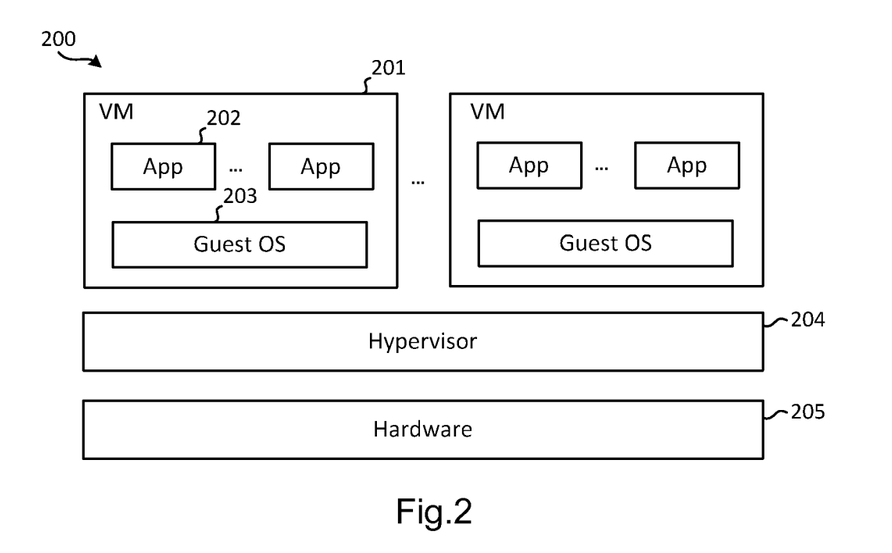
FIG. 2 shows a schematic block diagram of a virtualization enabled system.

Reference is now made to FIG. 2, which shows a schematic block diagram of virtualization enabled system 200. As shown, virtualization enabled system 200 enables to run a plurality of virtual machines (VMs). A plurality of guest applications 202 can be executed on each virtual machine 201. Guest applications 202 are hosted by guest operating system 203 (which can also be called a supervisor) of virtual machine 201. Virtualization enabled system 200 further includes hypervisor 204, which is a software layer in charge of managing access of virtual machine 201 to physical hardware 205 of virtualization enabled system 200. Both guest applications 202 and guest OS 203 on virtual machine 201 have no right to directly access physical hardware 205. In other words, all accesses of virtual machine 201 to physical hardware 205 must be done via hypervisor 204.

In the traditional software-managed TLB, the TLB is maintained at hardware 205 (hereinafter, also referred to as "hardware TLB"). Each entry in the hardware TLB maps the guest virtual address (GVA) in virtual machine 201 to a host physical address (HPA) in the system. VM 201 has no rights to directly access TLB. Moreover, guest OS 203 of each VM 201 has its own TLB which is maintained by hypervisor 204 and which is called "shadow TLB." The shadow TLB stores all TLB entries visible to guest OS 203, and each entry maps the GVA to a guest physical address (GPA) specific to the virtual machine.

According to the traditional software TLB management mechanism, when client application 203 executes a memory access instruction, hardware 205 queries the hardware TLB based on the GVA indicated by guest application 202. If a hardware TLB miss occurs, hardware 205 issues to hypervisor 204 an interrupt, for example, a trap message. In response, hypervisor 204 first queries the shadow TLB. If a corresponding valid TLB entry is found in the shadow TLB, then no TLB miss occurs from the perspective of guest OS 203. At this point, hypervisor 204 determines a GPA corresponding to the GVA based on the corresponding entry in the shadow TLB, and then determines an HPA corresponding to the GPA. Finally, the entry that maps the GVA to the HPA is written into the TLB.

On the other hand, if hypervisor 204 does not find a corresponding entry in the shadow TLB, then a TLB miss occurs from the perspective of guest OS 203. At this point, hypervisor 204 issues an interrupt to guest OS 203 of VM 201, and switches the control to guest OS 203. In response, guest OS 203 queries the page table to determine the GPA corresponding to the GVA. Then guest OS 203 issues a TLB write instruction (for example, "tlbwe" instruction) for writing into the TLB the entry that maps the GVA to the GPA. Since guest OS 203 has no rights to access the physical layer, hardware 205 issues an interrupt to hypervisor 204 once again, such that hypervisor 204 writes into the shadow TLB the entry that maps the GVA to the GPA for future use. From the perspective of guest OS 203, the TLB write is successfully performed.

According to the above traditional management mechanism, a series of operations caused by the TLB access, especially by the TLB miss, must involve hypervisor 204. Moreover, the transfer of control between hypervisor 204 and guest OS 203 will cause switching between the privilege mode and the user mode. These will incur considerable system overheads and significantly affect system performance and efficiency. Quantitatively, the overheads caused by hypervisor 204 responsive to TLB misses may account 70% of the total overheads of the system.

It should be understood through the following depiction that according to embodiments of the present invention, a series of operations caused by a TLB miss would not need intervening by the hypervisor. On the contrary, when a TLB miss occurs, the hardware directly issues an interrupt to a virtual machine; more specifically, an operating system of the virtual machine. In this way, the TLB can be efficiently managed by means of a hardware-level auxiliary translation table. Accordingly, system overheads can be significantly reduced and system performance can be improved.

According to embodiments of the present invention, and contrary to the traditional TLB software management mechanism, there is provided an auxiliary translation table, which, for example, can be called a "logical to real address translation (LRAT)" table. Each entry in the LRAT table maps a GPA to a HPA. According to embodiments of the present invention, the auxiliary translation table can be stored in hardware 205. Each entry of the auxiliary translation table in hardware 205 can be specific to VM 201. For example, each auxiliary translation table entry can have a field for storing identification information of VM 201. On the other hand, one guest OS 203 can correspond to one or more entries in the auxiliary translation table. Furthermore, according to embodiments of the present invention, the auxiliary translation table can be maintained and managed by hypervisor 204. For example, hypervisor 204 can have a dedicated module for managing the auxiliary translation table. Accordingly, hypervisor 204 does not need to maintain a shadow TLB as in the traditional software management mechanism.

It should be understood that the scope of the present invention is not limited to using the form of table to realize auxiliary address translation. To the contrary, the "auxiliary translation table" here can be implemented as various other data structures such as diagrams, trees, etc. Moreover, in practice, the auxiliary translation table can be implemented into various forms, for example, including but not limited to, one or more of the following: pure text, structured text, database files, etc.

According to embodiments of the present invention, hardware 205 can be configured to perform the following operation. First, hardware 205 can utilize a guest virtual address indicated by a memory access instruction to query the TLB, wherein the memory access instruction is received from virtual machine 201 executing in the system. Then, in response to missing the guest virtual address in the TLB, hardware 205 issues an interrupt to virtual machine 201 to cause virtual machine 201 to process the miss. Next, based on the result of processing the miss by virtual machine 201, hardware 205 can manage the TLB using the auxiliary translation table. As discussed above, each entry in the TLB will map a GPA to a HPA.

Hereinafter, several embodiments of the present invention will be described in detail. Continue to refer to FIG. 2, during operation, when guest application 202 executes a memory access instruction, hardware 205 utilizes a GVA indicated by guest application 202 to query the TLB. If a corresponding valid entry is found (i.e., TLB hit), then the instruction is executed. If no valid entry is found in the TLB (TLB miss), then hardware 205 directly issues an interrupt to VM 201 on which guest application 202 resides. The interrupt, for example, can be received by guest OS 203 of VM 201. It should be noted that, different from a traditional software-managed TLB, hardware 205 does not issue any interrupt or exception to hypervisor 204 when TLB miss occurs.

Responsive to the interrupt from hardware 205, guest OS 203 of VM 201 can query the page table to determine a GPA corresponding to the GVA. Then guest OS 203 issues a TLB write instruction so as to attempt to write into the TLB an entry that maps the GVA to the GPA. However, as discussed above, what are stored in the TLB are the entries that map GVAs to HPAs. Therefore, hardware 205 will not directly write into the TLB the entry from OS 203 which maps GVA to GPA. Instead, according to embodiments of the present invention, hardware 205 can use the identifications of the GPA and VM 201 to query the auxiliary translation table. If an entry associated with GPA of VM 201 is found in the auxiliary translation table, then hardware 205 determines the HPA corresponding to the GPA based on the entry in the auxiliary translation table. As such, hardware 205 can generate and write into the TLB an entry that maps the GVA to the HPA.

On the other hand, if hardware 205 fails to find an entry associated with GPA in the auxiliary translation table (since the capacity of auxiliary translation can be very large, such occasion rarely occurs), then hardware 205 issues an interrupt to hypervisor 204. In response, hypervisor 204 determines the HPA corresponding to the GPA indicated by guest OS 203. This can be done because it is hypervisor 204 that controls the entire system. Then, hypervisor 204 generates an entry that maps the GPA to the HPA and writes the generated entry into the auxiliary translation table. Thereafter the TLB write instruction of VM 201 continues to be executed. At this point, since the auxiliary translation table has been updated by hypervisor 204, hardware 205 can determine the HPA corresponding to the GPA by querying the auxiliary translation table. Accordingly, hardware 205 can generate an entry that maps the GVA to the HPA and writes the generated entry into the TLB.

Figure 3:
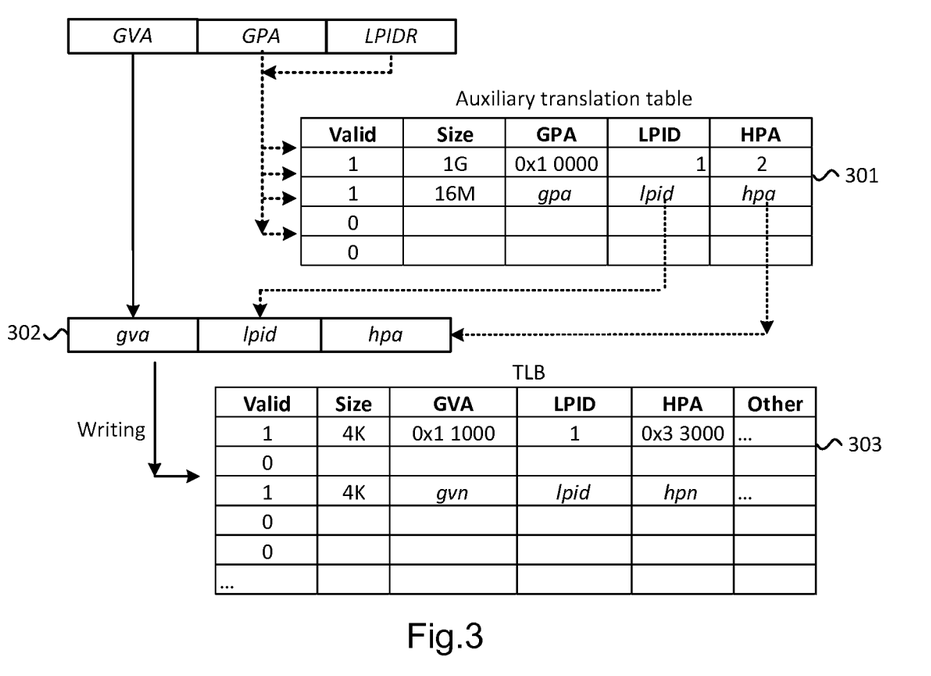
FIG. 3 shows a block diagram of a working principle of an auxiliary translation table according to exemplary embodiments of the present invention.

A specific example will now be described with reference to FIG. 3. In the example shown in FIG. 3, auxiliary translation table 301 can include the fields of valid bit, size, guest physical address GPA (for example, it can be denoted as the guest physical page number GPN), logic partition identification LPID (i.e., VM identifier) and a host physical address HPA (for example, it can be denoted as a host physical page number HPN). It should be noted that the format of the auxiliary translation table as shown in FIG. 3 is only exemplary and does not limit the scope of the present invention. According to embodiments of the present invention, the auxiliary translation table can include any alternative or additional field.

In operation, when guest OS 203 of VM 201 attempts to write into the TLB the entry that maps a GVA to a GPA, hardware 205 utilizes the GPA and the identifier, or LPID, of VM 201 (LPID) to query auxiliary translation table 301. Responsive to finding a corresponding entry in the auxiliary translation table, hardware 205 automatically generates entry 302 that maps the GVA to the HPA (in this example, the entry further comprises a virtual machine identifier LPID) and writes entry 302 into TLB 303. The above process is transparent to VM 201 and its guest OS 203 without any intervention of hypervisor 204.

It can be seen that according to embodiments of the present invention, it is unnecessary to maintain a dedicated shadow TLB by the hypervisor. Moreover, when a TLB miss occurs, the hardware directly issues an interrupt to guest OS 203 of VM 201 so as to determine the GPA corresponding to the GVA. Next, responsive to the TLB write request from the guest OS, hardware 205 automatically queries the auxiliary translation table with the GPA. In the case of an auxiliary translation table hit, the processing of TLB miss needs no intervention of the hypervisor at all. The hypervisor only needs to maintain the auxiliary translation table. Therefore, system overheads can be significantly reduced and overall performance of the system can be enhanced. Experiments show that compared with the traditional software TLB management mechanism, embodiments of the present invention can improve the system performance by at least 200%.

Additionally, embodiments of the present invention further enable input/output (I/O) device access in a virtualized system. As is known, in a virtualization enabled system, the access of a virtual machine to an I/O device can be achieved by the memory mapping I/O (MIMIO). The address of the I/O device is placed in the memory space. When the guest application attempts to access the I/O device, it can issue a memory access instruction just like an access to the memory. In a memory access instruction for I/O device access, the indicated GVA is not a valid address in the memory space, but represents the address of the I/O device to be accessed.

When the guest application accesses the I/O device, the hardware will query the hardware TLB using the GVA. Also as is known, the address associated with the I/O device will never be written into the TLB. Therefore, a TLB miss must occur in this case. In the traditional software management TLB, as discussed above, the hardware issues an interrupt to the hypervisor. The hypervisor can determine, based on the GVA, the access target of the guest application is not the memory but the I/O device, and starts the I/O processing process accordingly. However, according to embodiments of the present invention, upon occurrence of TLB miss, the hardware does not issue an interrupt to the hypervisor. Therefore, the hypervisor will not be triggered to process the access for the I/O device.

According to embodiments of the present invention, several feasible approaches can be used to solve this problem. For example, in some embodiments, hypervisor 204 can still keep the shadow TLB. Upon occurrence of a TLB miss, hardware 205 can determine whether the TLB miss belongs to an instruction TLB miss or a data TLB miss. Since all the TLB misses caused by the I/O access belong to data TLB miss, when a data TLB miss occurs, hypervisor 204 can process by means of the shadow TLB like the traditional approach. On the other hand, if an instruction TLB miss occurs, the processing can be performed by use of the auxiliary translation table according to the embodiments discussed above, without reference to the shadow TLB.

To further improve system performance, some alternative embodiments provide that when a TLB miss occurs, hardware 205 issues an interrupt to VM 201 instead of hypervisor 204. As discussed above, guest OS 203 of VM 201 queries the page table to determine the GPA corresponding to the GVA and attempts to execute the TLB write instruction. Such operations will cause hardware 205 to query the auxiliary translation table. According to embodiments of the present invention, the GPA associated with the I/O device will never be written into the auxiliary translation table. Therefore, an auxiliary translation table miss will occur. In this event, hardware 205 issues an interrupt to hypervisor 204. Accordingly, hypervisor 204 can determine an HPA corresponding to the GPA. Moreover, based on the target address, hypervisor 204 can further determine whether the current memory access instruction is directed to a memory access or I/O access. If hypervisor 204 determines that the current memory access instruction is directed to an access to the memory space, then hypervisor 204 writes into the TLB the entry that maps the GVA to the HPA, as described above.

If hypervisor 204 determines that the current memory access instruction is directed to an access to the I/O device instead of the memory space, then hypervisor 204 writes a modified entry into the TLB. Specifically, the entry that maps the GVA to the HPA is written into the TLB, with all the accesses to the written entry being prohibited. For example, this can be implemented by setting all the access rights to the entry to "No." Then hypervisor 204 returns and the TLB write instruction continues to be executed. At this point, hardware 205 determines that the TLB includes the entry of the GVA indicated by OS 203 and this entry, however, is forbidden to be accessed. In this event, according to embodiments of the present invention, hardware 205 issues an interrupt to hypervisor 204 to indicate a data storage exception. In response to the interrupt, hypervisor 204 receives the address indicated by guest OS 203, and can determine that the actual access target is I/O device on that basis. Accordingly, hypervisor 204 can execute the required I/O processing.

Alternatively, according to some other embodiments, it is possible to use a hardware-level register mapping mechanism to support MIMIO. As known, when a data TLB miss occurs, the hardware will generate an interrupt while recording context of the memory access instruction that causes the miss into a hardware register, for example, the data exception address register (DEAR) or any other appropriate registers. The "context" here includes an address that causes the exception, for example. According to embodiments of the present invention, a duplicated register can be established in the hardware for storing the context. This duplicated register is specific to VM 201 or guest OS 203. When a TLB miss occurs, the associated context is stored into the associated register (for example, DEAR) and copied into the duplicated register.

According to these embodiments, when a TLB miss occurs due to the I/O access, hardware 205 issues an interrupt to VM 201 while the context of the TLB miss is copied to the duplicated register. When VM 201 attempts to execute TLB write, it will cause an auxiliary translation table miss, thereby switching the control to hypervisor 204. In this event, hypervisor 204 can access the duplicated register specific to OS 203 to obtain the context of the memory instruction. It should be noted that at this point, although the content of the primary register (for example, DEAR) can vary with running of the system, the content saved in the duplicated register specific to OS 203 is still the context of the TLB miss caused by I/O access. In this way, hypervisor 204 can invoke relevant processes to perform the I/O processing based on the obtained context.

Figure 4:
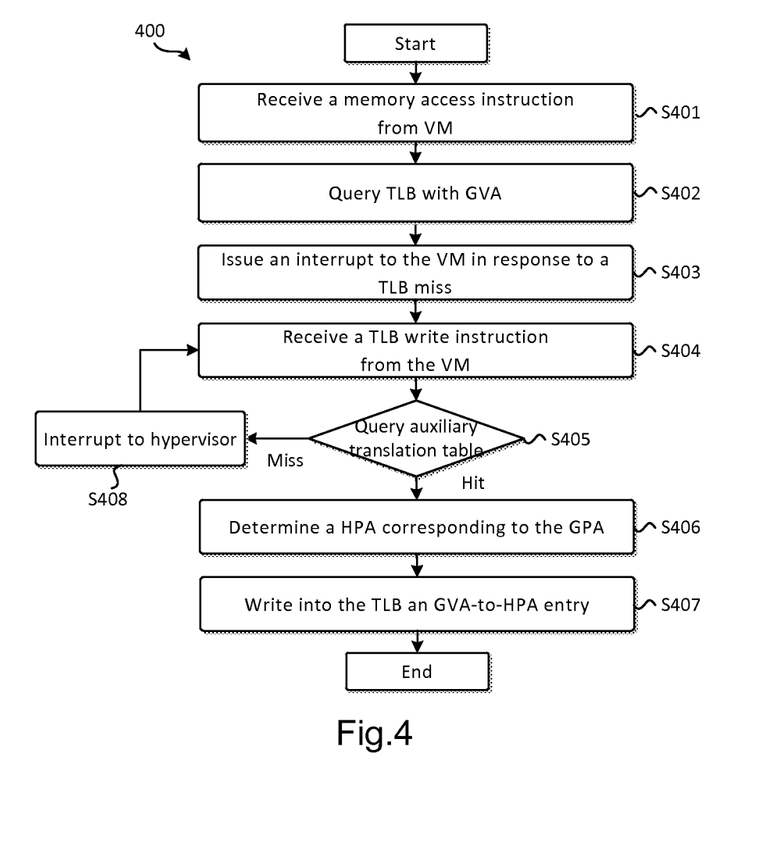
FIG. 4 shows a schematic flowchart of a method for managing a TLB according to exemplary embodiments of the present invention.

Reference is now made to FIG. 4, where a flowchart of method 400 for TLB management according to exemplary embodiments of the present invention is shown. It should be understood that method 400 can be performed by the underlying hardware devices in a virtualization enabled system, for example, hardware 205 as described with reference to FIG. 2.

As shown, after method 400 starts, at step S401, a memory access instruction from a virtual machine running in a system is received. Next, at step S402, the TLB is queried with a guest virtual address (GVA) indicated by the memory access instruction. If the GVA is missed in the TLB, then method 400 proceeds to step S403 where an interrupt is issued to the virtual machine to cause the virtual machine to process the miss. Optionally, a context of the memory access instruction can also be stored in the register specific to the virtual machine for use in potential MMIO processing.

Then at steps S404-S408, the hardware manages the TLB using an auxiliary translation table based on a result of processing the miss by the virtual machine. As discussed above, the processing of the miss by the virtual machine can include: querying a page table to determine a guest physical address corresponding to the guest virtual address; and issuing a TLB write instruction for writing into the TLB an entry that maps the guest virtual address to the guest physical address. Accordingly, according to some embodiments, at step S404, a TLB write instruction from the virtual machine is received, where the TLB write instruction is for writing into the TLB an entry that maps the GVA to the GPA. Next, at step S405, the auxiliary translation table is queried with the GPA. In the case of hit, an HPA corresponding to the GPA is determined at step S406, and an entry that maps the GVA to the HPA is written into the TLB at step S407. If it is determined at step S405 that the GPA is missed in the auxiliary translation table, an interrupt is issued to the hypervisor of the system at step S408 to cause the hypervisor to update the auxiliary translation table, as discussed above. After the auxiliary translation table is updated by the hypervisor, the hardware returns to step S404 to continue to execute the TLB write instruction from the virtual machine.

On the other hand, if a TLB hit is determined at step S402, then optionally, it can be determined whether an entry containing the GVA in the TLB is prohibited to be accessed (not shown). If that entry is prohibited to be accessed, which indicates that the current memory access instruction is actually directed to an access to the I/O device, then an interrupt indicating a data storage exception can be issued to the hypervisor of the system, such that the hypervisor performs corresponding I/O processing.

Figure 5:
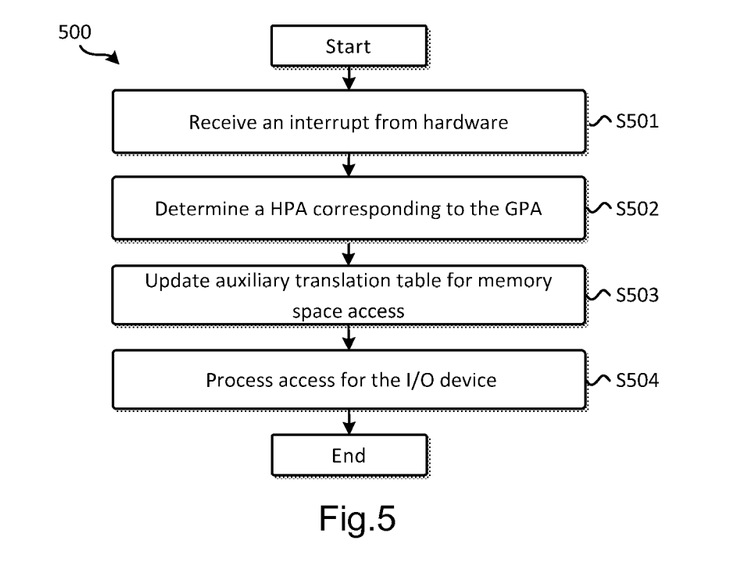
FIG. 5 shows a schematic flowchart of a method for managing a TLB according to exemplary embodiments of the present invention.

Next refer to FIG. 5, which shows a flowchart of method 500 for TLB management according to exemplary embodiments of the present invention. It could be understood that method 500 can be performed by a hypervisor in a virtualization enabled system, for example, hypervisor 204 as described above with reference to FIG. 2.

As shown in FIG. 5, at step S501, an interrupt from the hardware of the system is received. As discussed above, the interrupt is caused by a miss of a GPA in an auxiliary translation table, where the GPA is determined based on a memory access instruction issued by the virtual machine (corresponding to the GVA indicated by the instruction). In response to receiving an interrupt, at step S502, an HPA corresponding to the GPA is determined. It should be appreciated that the hypervisor controls running of the entire system and therefore knows the correspondence between the GPA and the HPA. Method 500 further proceeds to step S503 where for a memory access instruction directed to memory space access, an entry that maps the GPA to the HPA is written into the auxiliary translation table to update the auxiliary translation table.

On the other hand, in an MIMO enabled system, if the hypervisor determines that the memory access instruction is directed to an access to the I/O device, then method 500 can proceed to the optional step S504 to process the access to the I/O device. According to some embodiments, the processing of step S504 includes: writing into the auxiliary translation table an entry that maps the GPA to the HPA while prohibiting the access to the written entry. Alternatively, a register specific to the virtual machine (for example, the duplicated register GDEAR as described above) can be accessed to obtain the context of the memory access instruction. Then access to the I/O device can be executed based on the obtained context.

Figure 6:
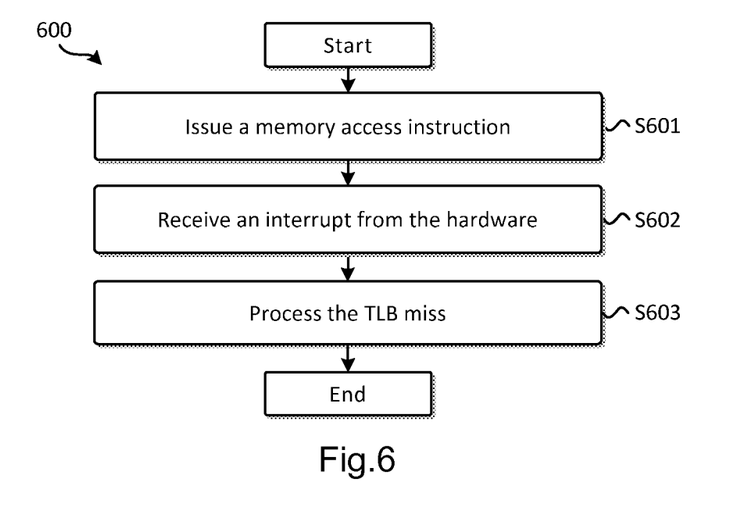
FIG. 6 shows a schematic flowchart of a method for managing a TLB according to exemplary embodiments of the present invention.

Refer to FIG. 6, which shows a flowchart of method 600 for TLB management according to exemplary embodiments of the present invention. It should be appreciated that method 600 can be performed by a virtual machine in a virtualization enabled system. More specifically, method 600 can be executed by a guest OS of the virtual machine, for example, guest OS 203 as described above with reference to FIG. 2.

After method 600 starts, at step 601, a memory access instruction is issued. The memory access instruction can indicate a GVA specific to the VM. Next, at step S602, an interrupt caused by a miss of the GVA in the TLB is received from hardware. In response to the interrupt, at step S603, the miss in TLB is processed in response to the interrupt. Specifically, according to embodiments of the present invention, the processing at step S603 can include: determining an HPA corresponding to the GVA by querying a page table, and issuing a TLB write instruction for writing into the TLB an entry that maps the GVA to the GPA. It would be appreciated that instead of actually writing such entry, the hardware generates and writes into the TLB an entry that maps the GVA to the HPA by means of an auxiliary address translation table.

Figure 7:
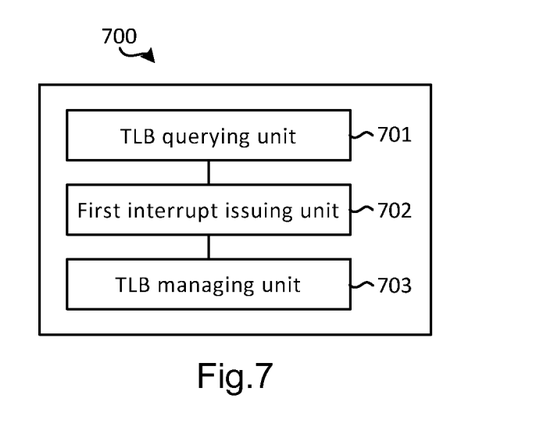
FIG. 7 shows a schematic block diagram of an apparatus for managing a TLB according to exemplary embodiments of the present invention.

Now, refer to FIG. 7, which shows a block diagram of apparatus 700 for TLB management according to exemplary embodiments of the present invention. Apparatus 700, for example, can be implemented as hardware residing in a system and can be configured to perform method 400 as described above. Specifically, according to some embodiments, apparatus 700 can be implemented as an application-specific integrated circuit, a general-purpose integrated circuit, a field programmable field gate array, or any other appropriate apparatus that is implemented by hardware. Various units included by apparatus 700, as depicted infra, can be implemented as corresponding hardware modules.

As shown in FIG. 7, according to embodiments of the present invention, apparatus 700 includes: TLB querying unit 701 configured to query the TLB with a guest virtual address indicated by a memory access instruction, the memory access instruction being received from a virtual machine running in the system; first instruction issuing unit 702 configured to issue, in response to a miss of the guest virtual address in the TLB, an interrupt to the virtual machine to cause the virtual machine to process the miss; and TLB managing unit 703 configured to manage the TLB using an auxiliary translation table based on a result of the processing of the miss by the virtual machine, where an entry of the auxiliary translation table maps a guest physical address to a host physical address in the system.

According to some embodiments of the present invention, apparatus 700 can further include: a TLB write instruction receiving unit configured to receive a TLB write instruction from the virtual machine, the TLB write instruction being for writing into the TLB an entry that maps the guest virtual address to a guest physical address; a translation table querying unit configured to query an auxiliary translation table with the guest physical address; an address translating unit configured to determine, in response to a hit of the guest physical address in the auxiliary translation table, a host physical address corresponding to the guest physical address; and a TLB writing unit configured to write into the TLB an entry that maps the guest virtual address to the host physical address.

According to some embodiments, the apparatus can further include: a second interrupt issuing unit configured to issue, in response to a miss of the guest physical address in the auxiliary translation table, an interrupt to a hypervisor of the system to cause the hypervisor to update the auxiliary translation table.

According to other embodiments, apparatus 700 can further include: a third interrupt issuing unit configured to issue, in response to a hit of the guest virtual address in the TLB and an entry containing the guest virtual address being prohibited to be accessed, an interrupt indicating a data storage exception to the hypervisor of the system.

According to some embodiments, apparatus 700 can further include: a context storing unit configured to store, in response to a miss of the guest virtual address in the TLB, a context of the memory access instruction into a register specific to the virtual machine.

Figure 8:
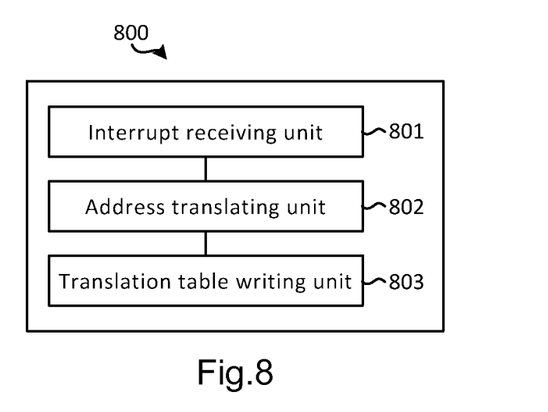
FIG. 8 shows a schematic block diagram of an apparatus for managing a TLB according to exemplary embodiments of the present invention.

Now, refer to FIG. 8, which shows a block diagram of apparatus 800 for TLB management according to exemplary embodiments of the present invention. Apparatus 800, for example, resides in a hypervisor of a system and can be configured to perform method 500 as described above. As shown, apparatus 800 includes: interrupt receiving unit 801 configured to receive interrupt from hardware of the system, the interrupt being caused by a miss of a guest physical address in an auxiliary translation table, the guest physical address being determined based on a memory access instruction issued by a virtual machine running in the system; address translating unit 802 configured to determine a host physical address in the system that corresponds to the guest physical address; and a translation table writing unit 803 configured to write, in response to the memory access instruction being directed to an access to the memory space, an entry that maps the guest physical address to the host physical address into the auxiliary translation table.

According to some embodiments, apparatus 800 can further include: a unit configured to write, in response to the memory access instruction being directed to an access to an input/output device, into the auxiliary translation table an entry that maps the guest physical address to the host physical address; and a unit configured to prohibit access to the written entry.

According to other embodiments of the present invention, apparatus 800 can further include: a unit configured to access, in response to the memory access instruction being directed to an access to an input/output device, a register specific to the virtual machine to obtain a context of the memory access instruction; and a unit configured to perform the access to the input/output device based on the obtained context.

Figure 9:
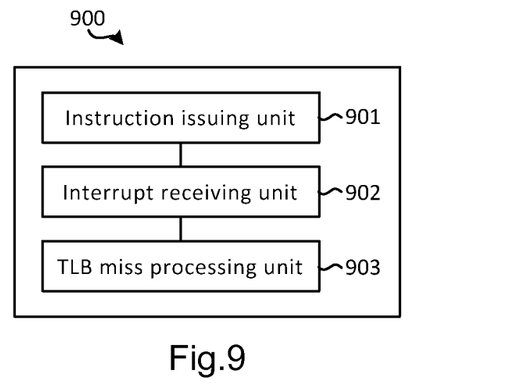
FIG. 9 shows a schematic block diagram of an apparatus for managing a TLB according to exemplary embodiments of the present invention.

FIG. 9 shows a block diagram of apparatus 900 for TLB management according to exemplary embodiments of the present invention. Apparatus 900, for example, resides in a virtual machine of a system and can be configured to perform method 600 as described above. As shown, according to embodiments of the present invention, apparatus 900 includes: instruction issuing unit 901 configured to issue a memory access instruction, the memory access instruction indicating a guest virtual address; interrupt receiving unit 902 configured to receive interrupt from hardware of the system, the instruction being caused by a miss of the guest virtual address in the TLB; and TLB miss processing unit 903 configured to process the miss in the TLB in response to the interrupt.

According to some embodiments, TLB miss processing unit 903 can include: a page table querying unit configured to query a page table to determine a guest physical address corresponding to the guest virtual address; and a TLB write instruction issuing unit configured to issue a TLB write instruction for writing into the TLB an entry that maps the guest virtual address to the guest physical address.

For the sake of clarity, FIGS. 7-9 do not show alternative units or sub-units comprised in the apparatus. However, it should be understood that all features and operations as depicted above are suitable to apparatuses 700-900, respectively, which are therefore omitted here. Moreover, the partitioning of the units or subunits in respective apparatuses is not limiting, but exemplary, intended to describe their major functions or operations logically. Functions of one unit can be implemented by multiple units; in turn, multiple units can also be implemented by one unit. The scope of the present invention is not limited thereto. Moreover, the units included in apparatuses 800 and 900 as depicted above can be implemented in various manners, including software, hardware, firmware, or any combination thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing a translation lookaside buffer (TLB) at hardware in a virtualization enabled system, the method comprising:
   querying the TLB with a guest virtual address indicated by a memory access instruction, the memory access instruction being received from a virtual machine running in the virtualization enabled system;
   in response to a miss of the guest virtual address in the TLB, issuing an interrupt to the virtual machine to cause the virtual machine to process the miss; and
   managing the TLB using an auxiliary translation table based on a result of a processing of the miss by the virtual machine, wherein an entry of the auxiliary translation table maps a guest physical address to a host physical address in the virtualization enabled system.

2. The method according to claim 1, wherein managing the TLB using an auxiliary translation table comprises:

receiving a TLB write instruction from the virtual machine, the TLB write instruction being for writing into the TLB an entry that maps the guest virtual address to a guest physical address;

querying the auxiliary translation table with the guest physical address;

in response to a hit of the guest physical address in the auxiliary translation table, determining the host physical address corresponding to the guest physical address; and writing into the TLB the entry that maps the guest virtual address to the host physical address.

3. The method according to claim 2, wherein managing the TLB using an auxiliary translation table further comprises:

in response to the miss of the guest physical address in the auxiliary translation table, issuing an interrupt to a hypervisor of the system to cause the hypervisor to update the auxiliary translation table.

4. The method according to claim 1, further comprising:

in response to a hit of the guest virtual address in the TLB and an entry containing the guest virtual address being prohibited to be accessed, issuing an interrupt indicating a data storage exception to a hypervisor of the virtualization enabled system.

5. The method according to claim 1, further comprising:

in response to the miss of the guest virtual address in the TLB, storing a context of the memory access instruction into a register specific to the virtual machine.

6. The method according to claim 1, wherein the result of the processing of the miss by the virtual machine comprises a TLB write instruction from the virtual machine, the TLB write instruction being for writing into the TLB an entry that maps the guest virtual address to a guest physical address, and the guest physical address being determined by the virtual machine by querying a page table.

7. A method for managing a TLB at a hypervisor in a virtualization enabled system, the method comprising:

receiving an interrupt from a hardware of the system, the interrupt being caused by a miss of a guest physical address in an auxiliary translation table, and the guest physical address being determined according to a memory access instruction issued by a virtual machine running in the virtualization enabled system;

determining a host physical address in the virtualization enabled system that corresponds to the guest physical address; and in response to the memory access instruction being directed to an access to a memory space, writing into the auxiliary translation table an entry that maps the guest physical address to the host physical address.

8. The method according to claim 7, further comprising:

in response to the memory access instruction being directed to an access to an input/output device, writing into the auxiliary translation table the entry that maps the guest physical address to the host physical address, thereby producing a written entry; and prohibiting access to the written entry.

9. The method according to claim 7, further comprising:

in response to the memory access instruction being directed to an access to an input/output device, accessing a register specific to the virtual machine to obtain a context of the memory access instruction; and performing an access to an input/output device based on the obtained context.

10. An apparatus for managing a TLB at hardware in a virtualization enabled system, the apparatus comprising:

a TLB querying unit configured to query the TLB with a guest virtual address indicated by a memory access instruction, the memory access instruction being received from a virtual machine running in the virtualization enabled system;

a first interrupt issuing unit configured to issue an interrupt to the virtual machine in response to a miss of the guest virtual address in the TLB, thereby causing the virtual machine to process the miss; and a TLB managing unit configured to manage the TLB using an auxiliary translation table based on a result of a processing of the miss by the virtual machine, wherein an entry of the auxiliary translation table maps a guest physical address to a host physical address in the system.

11. The apparatus according to claim 10, further comprising:

a TLB write instruction receiving unit configured to receive a TLB write instruction from the virtual machine, the TLB write instruction being for writing into the TLB an entry that maps the guest virtual address to a guest physical address;

a translation table querying unit configured to query the auxiliary translation table with the guest physical address;

an address translating unit configured to determine a host physical address corresponding to the guest physical address in response to a hit of the guest physical address in the auxiliary translation table; and a TLB writing unit configured to write into the TLB the entry that maps the guest virtual address to the host physical address.

12. The apparatus according to claim 11, further comprising:

a second interrupt issuing unit configured to issue an interrupt to a hypervisor of the virtualization enabled system in response to a miss of the guest physical address in the auxiliary translation table, thereby causing the hypervisor to update the auxiliary translation table.

13. The apparatus according to claim 10, further comprising:

a third interrupt issuing unit configured to issue an interrupt indicating a data storage exception to a hypervisor of the virtualization enabled system in response to a hit of the guest virtual address in the TLB and an entry containing the guest virtual address being prohibited to be accessed.

14. The apparatus according to claim 10, further comprising:

a context storing unit configured to store a context of the memory access instruction into a register specific to the virtual machine in response to the miss of the guest virtual address in the TLB.

15. The apparatus according to claim 10, wherein the result of the processing of the miss by the virtual machine comprises a TLB write instruction from the virtual machine, the TLB write instruction being for writing into the TLB an entry that maps the guest virtual address to a guest physical address, and the guest physical address being determined by the virtual machine by querying a page table.

16. An apparatus for managing a TLB at a hypervisor in a virtualization enabled system, the apparatus comprising:

an interrupt receiving unit configured to receive an interrupt from a hardware of the virtualization enabled system, the interrupt being caused by a miss of a guest physical address in an auxiliary translation table, and the guest physical address being determined according to a memory access instruction issued by a virtual machine running in the virtualization enabled system;

an address translating unit configured to determine a host physical address in the virtualization enabled system that corresponds to the guest physical address; and a translation table writing unit configured to write an entry into the auxiliary translation table in response to the memory access instruction being directed to an access to a memory space, wherein the entry maps the guest physical address to the host physical address.

17. The apparatus according to claim 16, further comprising:

a first unit configured to write the entry into the auxiliary translation table in response to the memory access instruction being directed to an access to an input/output device, thereby producing a written entry; and a second unit configured to prohibit access to the written entry.

18. The apparatus according to claim 16, further comprising:

a third unit configured to access a register in response to the memory access instruction being directed to an access to an input/output device, wherein the register is specific to the virtual machine to obtain a context of the memory access instruction; and a fourth unit configured to execute the access to the input/output device based on the obtained context.

* * * * *